No. 706,020. Patented Aug. 5, 1902.
F. E. CASE.
TRAIN CONTROL SYSTEM.
(Application filed Jan. 7, 1901.)
(No Model.)
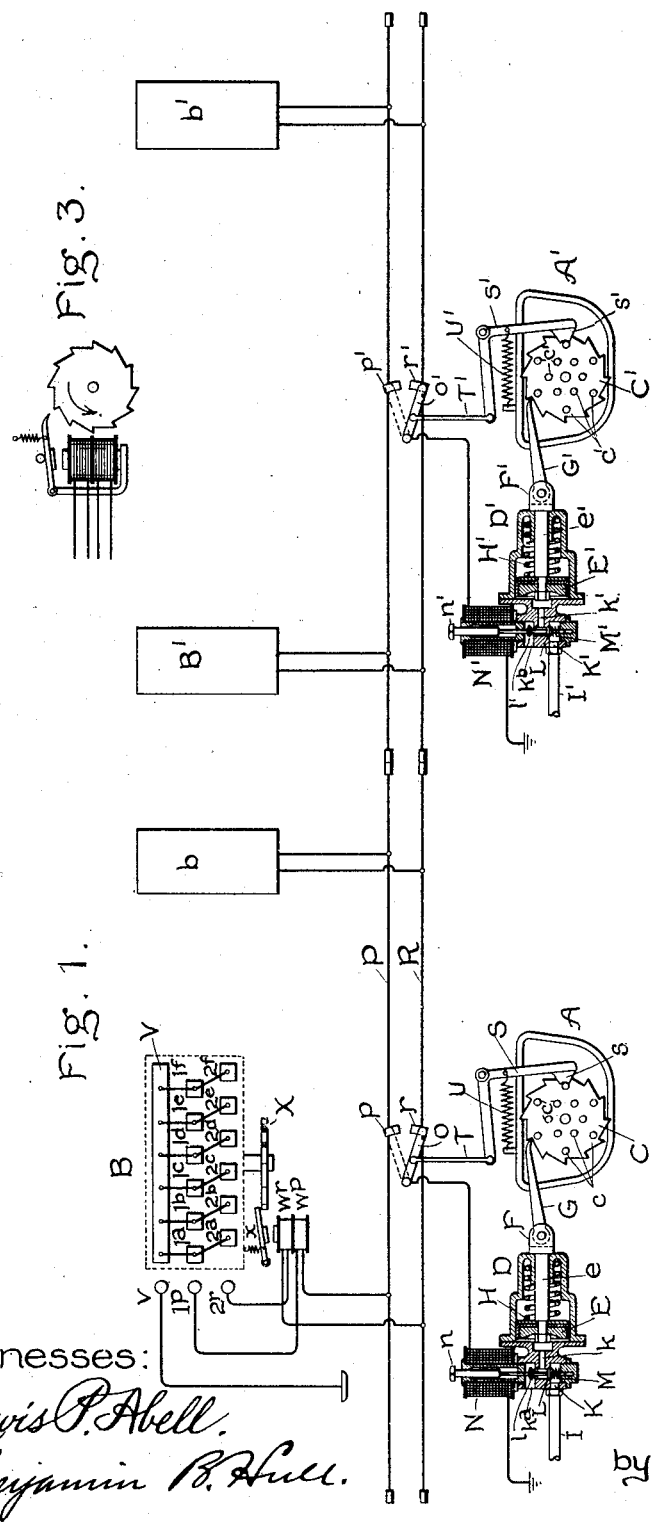
Witnesses:
Lewis P. Abell.
Benjamin B. Hull.
Inventor:
Frank E. Case,
by Albert G. Davis
Atty.
THE NORRIS PETERS CO., PHOTO-LITHO., WASHINGTON, D. C.

UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

TRAIN-CONTROL SYSTEM.

SPECIFICATION forming part of Letters Patent No. 706,020, dated August 5, 1902.

Application filed January 7, 1901. Serial No. 42,269. (No model.)

*To all whom it may concern:*

Be it known that I, FRANK E. CASE, a citizen of the United States, residing at Schenectady, county of Schenectady, State of New York, have invented certain new and useful Improvements in Train - Control Systems, (Case No. 1,522,) of which the following is a specification.

This invention relates to systems of circuits for controlling electric-railway trains; and it relates especially to those in which the car-controllers are actuated step by step, the actuating devices being controlled by an electric master-controller. Such a system is set forth in the patent to Westinghouse, No. 624,277, and my invention, for the sake of convenience, is shown as applied to the pneumatic step-by-step actuating devices therein disclosed.

In all systems involving the synchronous operation of circuit-controllers it is absolutely necessary that there shall be no possibility of one of the devices losing step and falling behind the others. My invention aims to render it impossible for such a mishap to occur in the practical operation of a train-control system using the Westinghouse fluid-pressure-actuated controllers or any controllers which are actuated step by step. In these controllers the contact-cylinder is provided with a ratchet-wheel which is actuated step by step by a pawl carried on a movable abutment, to which fluid-pressure is admitted by a valve operated by a solenoid electrically connected with the master-controller.

My invention comprises one or more controllers provided with step-by-step actuating devices, an operating system comprising a plurality of branches, a master-controller for supplying energy to the controller-actuating devices through either of the branches of the operating system, and means whereby each controller in operating breaks the connection between its actuating device and that branch of the operating system with which it is connected and makes a similar connection with another branch of said system. In the particular embodiment which I have illustrated in the present application the system which I have devised comprises one or more controllers, separate step-by-step actuating devices therefor controlled by solenoids, a double line of working conductors for said solenoids, a master-controller arranged to close a circuit alternately through said working conductors, and a switch mechanically thrown at each step of the controller-cylinder and operating to disconnect the solenoid from the active working conductor and to connect it to the inactive one. Where a plurality of controllers are thus connected up, current will flow through the master-controller until every switch has been thrown. As an additional safeguard, I provide an electric lock for the master-controller which is automatically released when, and only when, every switch has been thrown by the actuation of its respective controller and the controller-solenoids are all deënergized. It will be understood that the current for energizing the solenoids is always sent through the conductor to which the switches have been connected by the previous movement of the controllers and that the master-controller cannot be turned to send this current until every controller has thrown its switch. Hence if one or more car-controllers fail to act the fact is at once indicated by the refusal of the automatic locking device to release the master-controller.

In the drawings, Figure 1 is a diagrammatic representation of two car-circuits including my improvements. Fig. 2 is a side elevation of a train of three cars equipped with my invention. Fig. 3 shows a modified lock for the master-controller.

The two car-controllers A A' are located on two coupled cars of a train, which may comprise as many more similarly-equipped cars as may be desired. Thus in Fig. 2 three cars 1 2 3 are shown. Each car has at each end a master-controller B b B' b', by means of any one of which all the car-controllers A A' on the train can be simultaneously operated.

Each car-controller has on the shaft of its contact-cylinder a ratchet-wheel C C'. Adjacent to each car-controller is a cylinder D D', in which is fitted a piston E E'. The stem e e' of the piston projects outside of the cylinder and is enlarged to form a head F F'. Upon or in this head is pivoted a pawl G G', engaging the teeth of the ratchet-wheel C C'.

In order to retract the piston and the pawl connected therewith, a helical spring H H' is placed in the cylinder D D', encircling the piston-rod and bearing at one end against the piston and at the other end against the end of the cylinder.

Fluid-pressure for actuating the piston, and thereby turning the ratchet-wheel one step forward, is admitted through a pipe I I' to a chamber K K', from which it passes to a passage $k\ k'$, leading to the cylinder-space behind the piston. The passage $k\ k'$ normally communicates with the atmosphere by means of a passage $k^a\ k^b$, while a valve L L' closes the communication between the chamber K K' and the passage $k\ k'$. On the stem of this valve is another valve $l\ l'$, which closes communication from the passage $k\ k'$ to the passage $k^a\ k^b$ when the stem is moved to admit fluid-pressure to the passage $k\ k'$. A spring M M' holds the valve L L' normally closed. In order to open this valve, a solenoid N N' is provided, whose movable core $n\ n'$ is connected with the common stem of the valves L L' $l\ l'$.

One terminal of the solenoid is grounded and the other is connected with a switch-arm O O', which can be moved to contact with one or the other of two plates $p\ p'\ r\ r'$, connected with two working conductors P and R. The switch-arm is arranged to be automatically thrown from one contact-plate to the other at each step of the ratchet-wheel. To this end I provide the ratchet-wheel with a double row of pins $c\ c'$, the pins in one row alternating with those in the other row. A bent lever S S' has one arm connected with the switch-arm, as by means of a link T T'. The other arm of the lever carries a block $s\ s'$, containing a notch to engage with a pin and having beveled sides, as shown. A spring U U' keeps the block pressed inward against the pin. When the block rests on a pin in the outer row, the switch-arm makes contact with the plates $r\ r'$ on the conductor R. At the next step of the car-controller the notched block drops in against a pin in the inner row and the switch-arm is thrown over to the plate $p\ p'$ on the conductor P. The next step of the car-controller brings a pin in the outer row against the beveled side of the notch-block, forcing it to move outwardly and returning the switch-arm to the plate $r\ r'$.

In order to render the working conductors P R alternately live and dead, the master-controller has a double set of contacts $1^a\ 2^a\ 1^b\ 2^b$, &c., each pair being connected with a strip V, to which the trolley-current is brought through a finger $v$. Two fingers $1^p\ 2^r$ are arranged to make contact, respectively, with the contacts $1^a\ 2^a$, &c., each of them being alternately in contact, but not both at the same time. Finger $1^p$ is connected with the conductor P through a helix $W^p$ and finger $2^r$ with conductor R through a helix $W^r$. For convenience both helices have a common core.

On the shaft of the drum carrying the master-controller contacts $1^a\ 2^a$, &c., is a ratchet-wheel X, with which a dog $x$ can engage to lock the drum against forward movement. The dog is moved into engagement with the ratchet by the helices $W^p\ W^r$ either by a lateral movement relatively to the ratchet, as in Fig. 1, or by a tangential movement, as in Fig. 3. A spring retracts the dog when the helix is deënergized.

In operation let the parts be as shown in Fig. 1, with the finger $v$ on the strip V and the finger $1^p$ on the contact $1^a$. A forward step of the master-controller drum carries the contact $1^a$ away from the finger $1^p$ and brings the contact $2^a$ under the finger $2^r$. This energizes the helix $W^r$ and locks the master-controller. It also sends current through the working conductor R, switch-arms O O', and solenoids N N', thereby admitting fluid-pressure to all the cylinders and giving each car-controller one forward step. Simultaneously with the movement of each controller its respective switch-arm is thrown over to the dead conductor P. If all the switch-arms move, the helix $W^r$ will become deënergized and the master-controller will be free to be turned another step; but if any car-controller fails to move its switch-arm remains on the conductor R and the master-controller stays locked until the faulty controller has been located and put in order.

What I claim as new, and desire to secure by Letters Patent of the United States, is—

1. The combination with a plurality of step-by-step controllers, of one or more master-controllers, and means for preventing the further operation of the master-controller in case any controller fails to operate.

2. The combination with a plurality of step-by-step controllers provided with actuating devices, of one or more master-controllers, and independent means associated with the several controllers for rendering inoperative the actuating device of each controller after each actuation thereof.

3. The combination with a plurality of step-by-step controllers provided with electrically-controlled actuating devices, of one or more master-controllers, and means for automatically opening the circuit of each controller-actuating device as soon as the corresponding controller has been operated.

4. The combination with a plurality of step-by-step controllers provided with electrically-controlled actuating devices, of one or more master-controllers, and means for automatically opening the circuit of each controller-actuating device at each step-by-step movement of the corresponding controller.

5. The combination with a plurality of step-by-step controllers provided with electrically-controlled actuating devices, of one or more master-controllers, and an electromagnetic lock for said master-controller in circuit with all of the controller-actuating devices.

6. The combination with a plurality of step-by-step controllers, provided with electrically-controlled actuating devices, of two working conductors, switch-arms automatically operated by the controllers to connect the actuating devices with each conductor alternately, one or more master-controllers, and an electromagnetic lock therefor in circuit with said conductors.

7. The combination with a plurality of step-by-step controllers, provided with electrically-controlled actuating devices, of two working conductors, switch-arms automatically operated by the controllers to connect the actuating devices with each conductor alternately, one or more master-controllers, a helix in circuit with each conductor, and a locking device for the master-controller operated by said helices.

8. The combination with a step-by-step controller, of a wheel carrying two sets of alternating pins, a lever actuated by said pins, a switch-arm connected with the lever, two conductors with which said switch-arm makes connection alternately when actuated, a controller-actuating device in circuit with said switch-arm, and means for energizing said conductors alternately.

9. The combination with two conductors, of a master-controller carrying contacts for connecting said conductors alternately with a source of current, a locking device for the controller operated by the current in said conductors, a plurality of controllers provided with electrically-controlled actuating devices, and means for connecting said devices to said conductors alternately.

10. The combination with a plurality of controllers, of separate step-by-step actuating devices for said controllers, an operating system for supplying energy to said actuating devices, and means whereby each controller in operating breaks the connection between its actuating device and the operating system.

11. The combination with one or more controllers, of separate step-by-step actuating devices for said controllers, an operating system comprising a plurality of branches, a master-controller for supplying energy to said actuating devices through either of the branches of the operating system, and means whereby each controller in operating breaks the connection between its actuating device and one of the branches of the operating system and makes a similar connection with another branch of said system.

12. The combination with one or more controllers, of separate step-by-step actuating devices for said controllers, an operating system comprising a plurality of branches, a master-controller for supplying energy to said actuating devices through either of the branches of the operating system, means whereby each controller in operating breaks the connection between its actuating device and one of the branches of the operating system and makes a similar connection with another branch of said system, and means for preventing a movement of the master-controller from one to another of its operative positions until all of the controllers have been similarly operated.

13. The combination with a plurality of controllers, of separate step-by-step actuating devices for said controllers, electromagnets for controlling the operation of said actuating devices, a conductor to which the several electromagnets are connected, a master-controller for supplying current to said electromagnets through said conductor, and means whereby each controller in operating breaks the connection between its electromagnet and the said conductor.

14. The combination with one or more controllers, of separate step-by-step actuating devices for said controllers, electromagnets for controlling the operation of the actuating devices, an operating system comprising a plurality of conductors, a master-controller for supplying current to the said electromagnets through either one of said conductors, and means whereby each controller in operating opens the circuit between its actuating electromagnet and the conductor through which current is being supplied to the same and makes a similar connection between said electromagnet and the other conductor of the operating system.

15. The combination with a plurality of step-by-step controllers, of separate electrically-controlled actuating devices therefor, two working conductors, a master-controller for supplying current to one or the other of said conductors, and means automatically operated by the controllers to connect each of the several actuating devices with the working conductors alternately.

16. The combination with one or more controllers, of separate electrically-controlled actuating devices therefor, two working conductors, a master-controller for supplying current to one or the other of said conductors, and means operated by each of the controllers to shift the connection of the actuating devices from one to the other of the working conductors alternately.

In witness whereof I have hereunto set my hand this 3d day of January, 1901.

FRANK E. CASE.

Witnesses:
BENJAMIN B. HULL,
MARGARET E. WOOLLEY.